(12) United States Patent
Kim

(10) Patent No.: US 8,365,085 B2
(45) Date of Patent: Jan. 29, 2013

(54) METHOD OF INDICATING FUNCTIONS OF BUTTONS, AN IMAGE DISPLAY APPARATUS, AND AN ON-SCREEN-DISPLAY MENU PROCESSING METHOD

(75) Inventor: Young-kook Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 2101 days.

(21) Appl. No.: 10/822,847

(22) Filed: Apr. 13, 2004

(65) Prior Publication Data

US 2004/0211282 A1    Oct. 28, 2004

(30) Foreign Application Priority Data

Apr. 16, 2003  (KR) .......................... 10-2003-0023974

(51) Int. Cl.
*G06F 3/048* (2006.01)
(52) U.S. Cl. ........................................ 715/771; 715/764
(58) Field of Classification Search .................. 715/771, 715/764; 345/649, 659
See application file for complete search history.

(56) References Cited

U.S. PATENT DOCUMENTS

| | | | | |
|---|---|---|---|---|
| 5,533,185 A * | 7/1996 | Lentz et al. | ..................... | 345/563 |
| 5,946,062 A * | 8/1999 | Hasegawa et al. | ............... | 349/58 |
| 5,963,266 A * | 10/1999 | Fujimori | ......................... | 348/511 |
| 5,973,664 A * | 10/1999 | Badger | ......................... | 345/659 |
| 5,992,570 A | 11/1999 | Walter et al. | | |
| 6,346,972 B1 * | 2/2002 | Kim | .............................. | 348/569 |
| 6,356,287 B1 * | 3/2002 | Ruberry et al. | ................ | 715/864 |
| 6,744,259 B2 * | 6/2004 | Bald | ............................. | 324/551 |
| 6,756,577 B2 * | 6/2004 | Nakanishi et al. | ........ | 250/214 R |
| 6,757,034 B2 * | 6/2004 | Yu | .................................... | 349/58 |
| 6,765,577 B1 * | 7/2004 | Tang et al. | ..................... | 345/471 |
| 7,002,604 B1 * | 2/2006 | Barrus et al. | .................. | 345/649 |
| 7,167,729 B1 * | 1/2007 | Kimura | ......................... | 455/566 |

FOREIGN PATENT DOCUMENTS

| | | |
|---|---|---|
| CN | 1417760 | 5/2003 |
| CN | 1421832 | 6/2003 |
| JP | 2001-326984 | 11/2001 |
| KR | P1993-011658 | 6/1993 |
| KR | 1020000050993 | 8/2000 |
| KR | 2000-0074855 | 12/2000 |
| KR | 1020000074855 | 12/2000 |
| KR | 1020010097994 | 11/2001 |
| KR | 1020020041199 | 6/2002 |

OTHER PUBLICATIONS

Pivot Pro Software, Pivot Pro Products, copyright 1998-2001, 1-3.*
NEC Technologies, MultiSync LCD 1510+ User's Manual, Aug. 20, 1999, pp. 6-10.*
Chinese Office Action dated Nov. 25, 2005 of Chinese Patent Application No. 200410043035.X.
Korean Office Action dated Oct. 25, 2007 issued in KR 2003-0023974.

* cited by examiner

*Primary Examiner* — Phenuel Salomon
(74) *Attorney, Agent, or Firm* — Stanzione & Kim, LLP

(57) ABSTRACT

A method of indicating functions of buttons included in an image display apparatus on a screen and an image display apparatus implementing the method thereof. The method of indicating functions of buttons includes generating an image indicating functions assigned to the buttons and displaying the image on the image display apparatus.

19 Claims, 10 Drawing Sheets

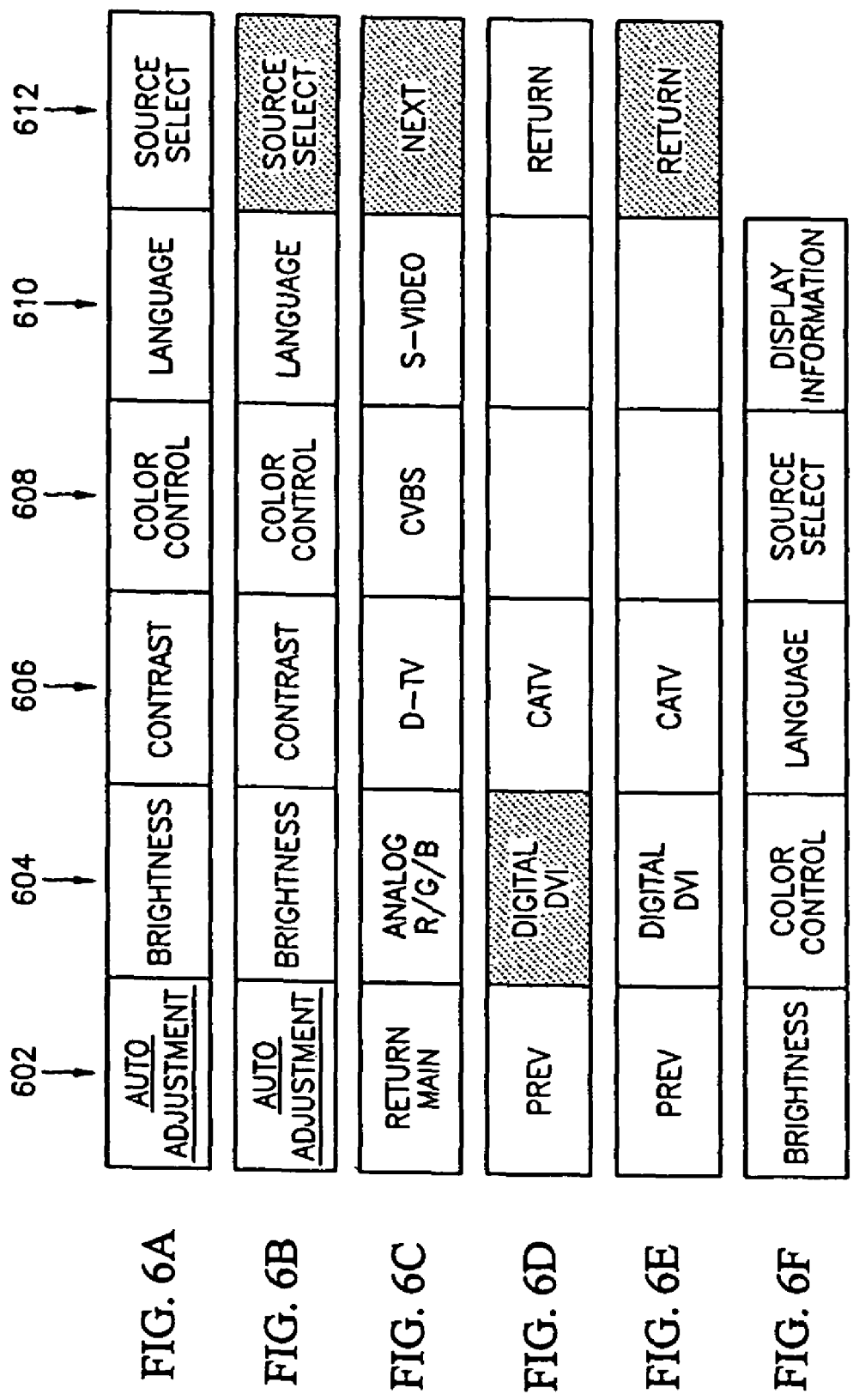

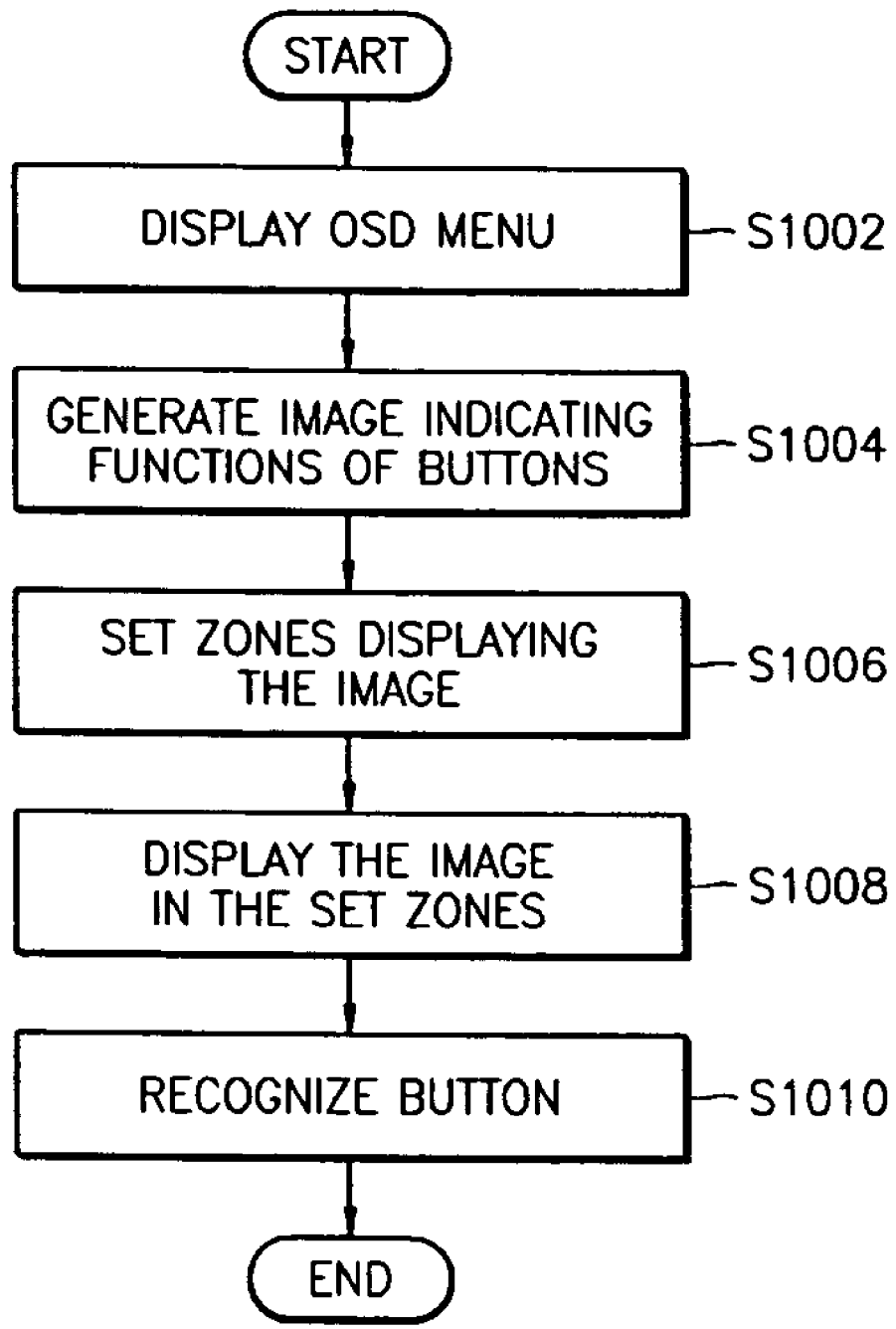

METHOD OF INDICATING FUNCTIONS OF BUTTONS, AN IMAGE DISPLAY APPARATUS, AND AN ON-SCREEN-DISPLAY MENU PROCESSING METHOD

CROSS-REFERENCE TO RELATED APPLICATIONS

This application claims the priority of Korean Patent Application No. 2003-23974, filed on Apr. 16, 2003, in the Korean Intellectual Property Office, the disclosure of which is incorporated herein in its entirety by reference.

BACKGROUND OF THE INVENTION

1. Field of the Invention

The present invention relates to an image display apparatus, and more particularly, to a method of displaying functions of buttons of an image display apparatus on a screen, an image display apparatus implementing the method, and a menu processing method employed by the image display apparatus.

2. Description of the Related Art

An image display apparatus, such as a monitor, includes buttons to set/control functions of the image display apparatus. In order to identify functions of the buttons, text or symbols are displayed on the surfaces of the buttons or around the buttons. The buttons commonly include a menu button which brings up an on screen display (OSD) menu, a select button which is used to select a certain item, a plus (+) button and a minus (−) button which are used to move a focus for selection of an item or increase/decrease a value of a selected item, and a power button which controls the supply of power. Besides the buttons as listed above, a multifunction image display apparatus capable of displaying various types of input signals may further include an auto button for automatically setting a screen size and a display position of an input digital input source.

The buttons and text are commonly installed on a front surface of a lower bezel of a frame surrounding a screen of a monitor where they are visible to a user. On the bezel, a mark indicating a manufacturer, a power button, and other buttons are also commonly installed.

A user brings up an OSD menu by pushing a menu button, selects a certain item from the menu, and adjusts a value of the selected item.

A conventional image display apparatus has text indicating functions of buttons around the buttons of the apparatus. However, since a certain area is required for the text indicating the functions of the buttons, the size and shape of the frame is restricted. Also, since the text, once printed, cannot be changed, and the functions of the buttons are limited by the text due to the relationship between the buttons and the text, support of a pivot function and a plurality of languages is also limited.

FIG. 1 is a view of the exterior of a conventional display apparatus. Referring to FIG. 1, the conventional display apparatus includes buttons on the bezel, and text printed around the buttons to indicate functions of the buttons.

The apparatus of FIG. 1 is operated as follows. First, if a menu button 112 is pushed, an OSD menu having selectable items is displayed in the center of the screen. The selectable items are focused on using +/− buttons 116 and 118 and selected by a select button 114. An adjustable value of a selected item, for example, a brightness value, is increased/decreased using the +/− buttons 116 and 118. The select button 114 and the menu button 112 each perform a toggle operation. For example, if the select button is pushed once, a focused-on item is activated, and if the select button is pushed once again, the focused-on item is deactivated.

The focus is something like a bar moving among the selectable items and indicates when items are in a state capable of being activated. When a certain item is focused on, this item is in a state capable of being activated. For example, a focused-on state may be indicated by inverting the color scheme of text and background of the focused-on item.

In a conventional image display apparatus, to indicate functions of buttons to a user, text is printed around the buttons, for example, above or below the buttons. The conventional method of indicating the functions of the buttons by the text limits the readability of the text and restricts design parameters of the image display apparatus and of a menu.

First, the fact that space is required for the printed text limits design parameters of the exterior of the image display apparatus. For example, when a frame is designed, the width of a bezel portion is restricted to being no narrower than the space required for the buttons and text. Such design limitations are a serious problem in image display apparatuses whose frame accommodating a panel, such as an LCD panel, could otherwise be minimized.

Next, the fact that the printed text is fixed in position limits readability. In an LCD panel, due to characteristics of light weight and easy handling, it is possible to install and use the LCD panel horizontally and also vertically. This function is called a pivot function, and for this function, the latest LCD panels come with a pivot unit. However, when an LCD panel having printed text is vertically pivoted, it becomes difficult for a user to read the text. Thus, it becomes difficult for the user to recognize the functions of buttons.

Also, the language of the printed text is fixed, usually in the local language or English. Therefore, users who cannot understand the printed language cannot recognize the functions of buttons.

Moreover, the relationship between the functions of buttons and the text limits the design of the menu. That is, once text indicating the functions of buttons are printed thereon, the functions of those buttons in manipulating the menu cannot be changed. For example, when selecting from among items listed in a menu, the conventional menu can be designed for selecting a certain item by a sequential method with buttons on which the symbols +/− are printed, but cannot be designed for selecting items by an arbitrary method.

SUMMARY OF THE INVENTION

The present invention provides an improved method of indicating functions of buttons that minimizes limitations of exterior design, and improves readability and a menu design.

The present invention also provides an image display apparatus implementing the method of indicating functions of buttons.

The present invention also provides a menu processing method employed by the image display apparatus.

Additional aspects and advantages of the invention will be set forth in part in the description which follows and, in part, will be obvious from the description, or may be learned by practice of the invention.

The foregoing and/or other aspects of the present invention are achieved by providing a method of indicating functions of buttons of an image display apparatus, the method including: generating an image indicating functions assigned to the buttons; and displaying the image on the image display apparatus.

It is an aspect of this embodiment that the image is text indicating the functions assigned to the buttons.

It is another aspect of this embodiment that the language of the text can be selected by a user.

It is another aspect of this embodiment that the image is displayed at a position on the image display apparatus close to the buttons.

It is another aspect of this embodiment that the method further includes: detecting a pivot angle of the image display apparatus; and displaying the image rotated according to the pivot angle.

The foregoing and/or other aspects of the present invention are also achieved by providing an image display apparatus having an image display unit, a graphics processing unit, which supplies images displayed by the image display unit, and a controller, which sets display parameters of the image display apparatus, has buttons for item selection, and performs operations assigned to the buttons, wherein the image display unit has zones to display an image indicating functions assigned the buttons, and the controller generates image information to be displayed in the zones and supplies the image information to the graphics processing unit.

It is an aspect of this embodiment that the zones to display an image indicating functions assigned to the buttons are located close to the buttons on the image display apparatus.

It is another aspect of this embodiment that the image is text indicating the functions assigned to the buttons.

It is another aspect of this embodiment that the apparatus further comprises a pivot detector, which detects a pivot angle of the image display apparatus and supplies pivot angle data to the graphics processing unit, and the graphics processing unit displays the image on the zones rotated according to the pivot angle.

The foregoing and/or other aspects of the present invention are also achieved by providing a menu processing method of an image display apparatus having buttons, the method including: displaying a menu including selectable items on the image display unit; generating an image indicating functions of the buttons to search for or select the selectable items; setting zones to display the image on the image display unit; displaying the image on the set zones; and recognizing whether a selectable items is selected according to whether a corresponding button is pushed.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIG. 6 shows a method of indicating functions of buttons according to yet another embodiment of the present invention;

FIG. 10 is a flowchart of an OSD menu processing method according to yet another embodiment of the present invention.

DETAILED DESCRIPTION OF THE PREFERRED EMBODIMENTS

Figure 1:
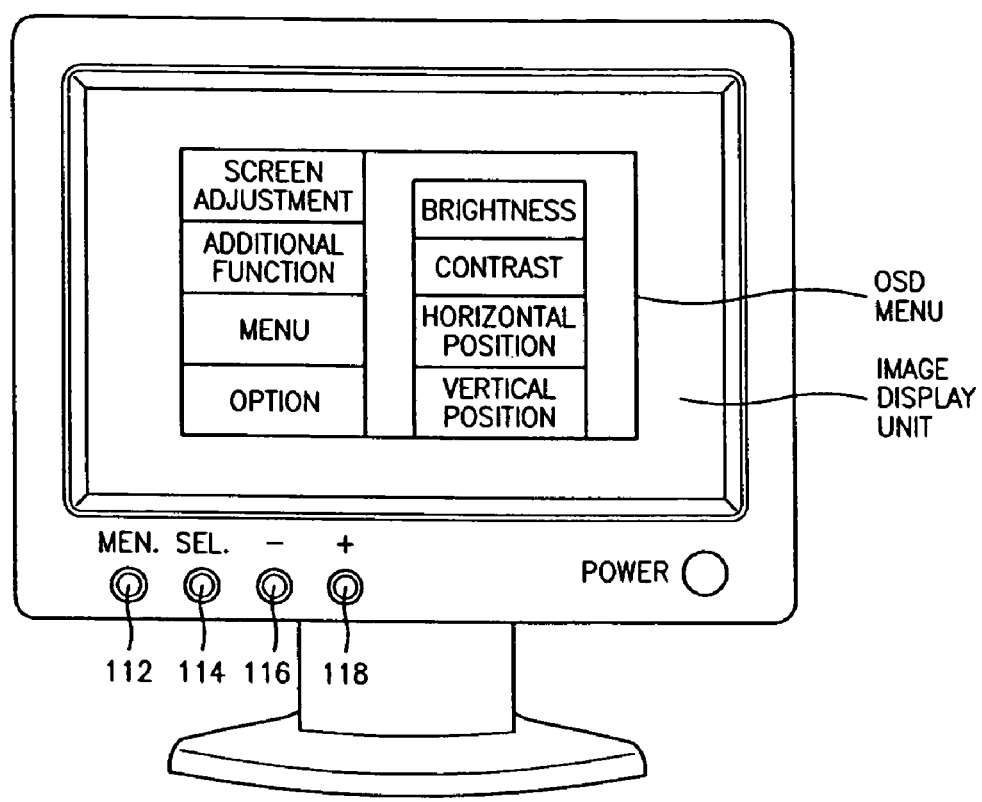
FIG. 1 is a view of the exterior of a conventional display apparatus.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
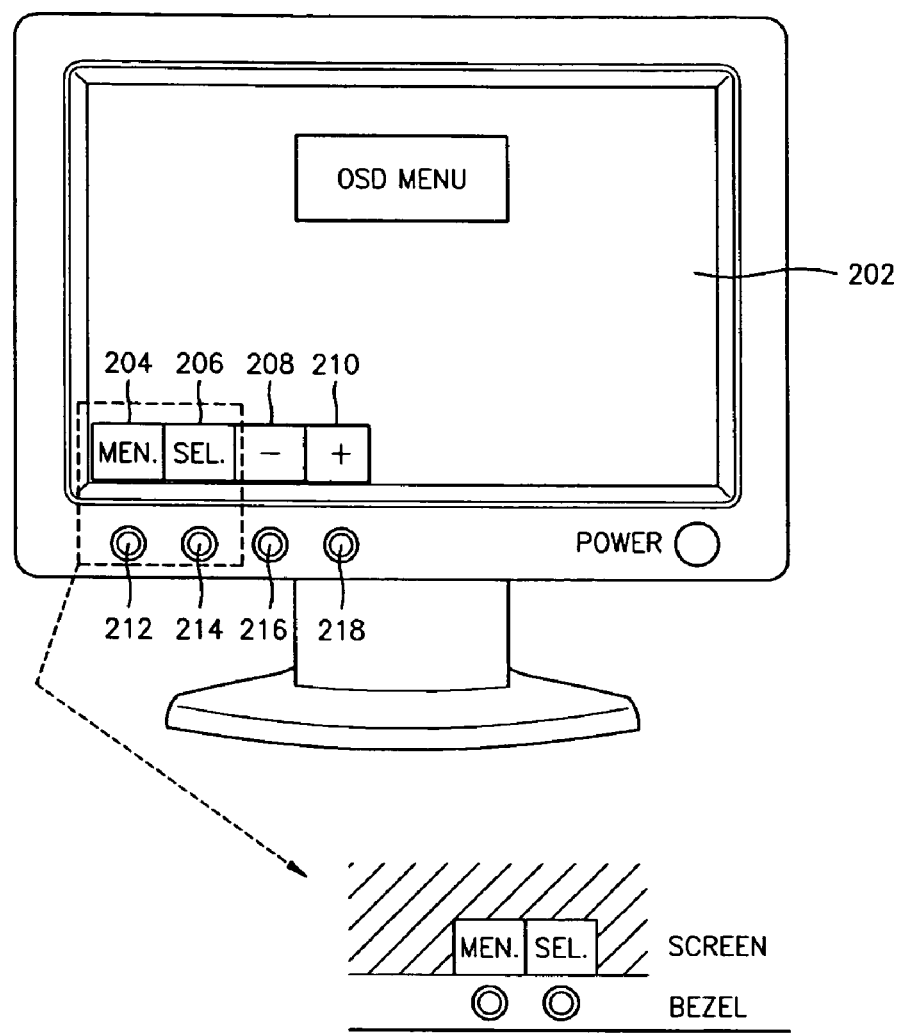
FIG. 2 is a view of an exterior of an image display apparatus implementing a method of indicating functions of buttons according to an embodiment of the present invention.

FIG. 2 is a method of indicating functions of buttons according to an embodiment of the present invention. Referring to FIG. 2, reference numeral 202 denotes a screen, reference numerals 204 through 210 denote zones of the screen 202 to display images indicating functions of buttons, and reference numerals 212 through 218 denote the buttons.

In a first display zone 204 through a fourth display zone 210, "menu", "select", "+", and "−" are displayed, respectively. A user can easily recognize that a first button 212 through a fourth button 218 have functions corresponding to "menu", "select", "+", and "−", respectively, due to spatial correspondence between the buttons 212 through 218 and the display zones 204 through 210.

In alternative embodiments of the method of indicating functions of buttons according to the present invention, different symbols can be displayed in the first through fourth display zones 204 through 210. For example, the symbols "↑" and "↓" can be used instead of the signs "+" and "−".

Figure 3:
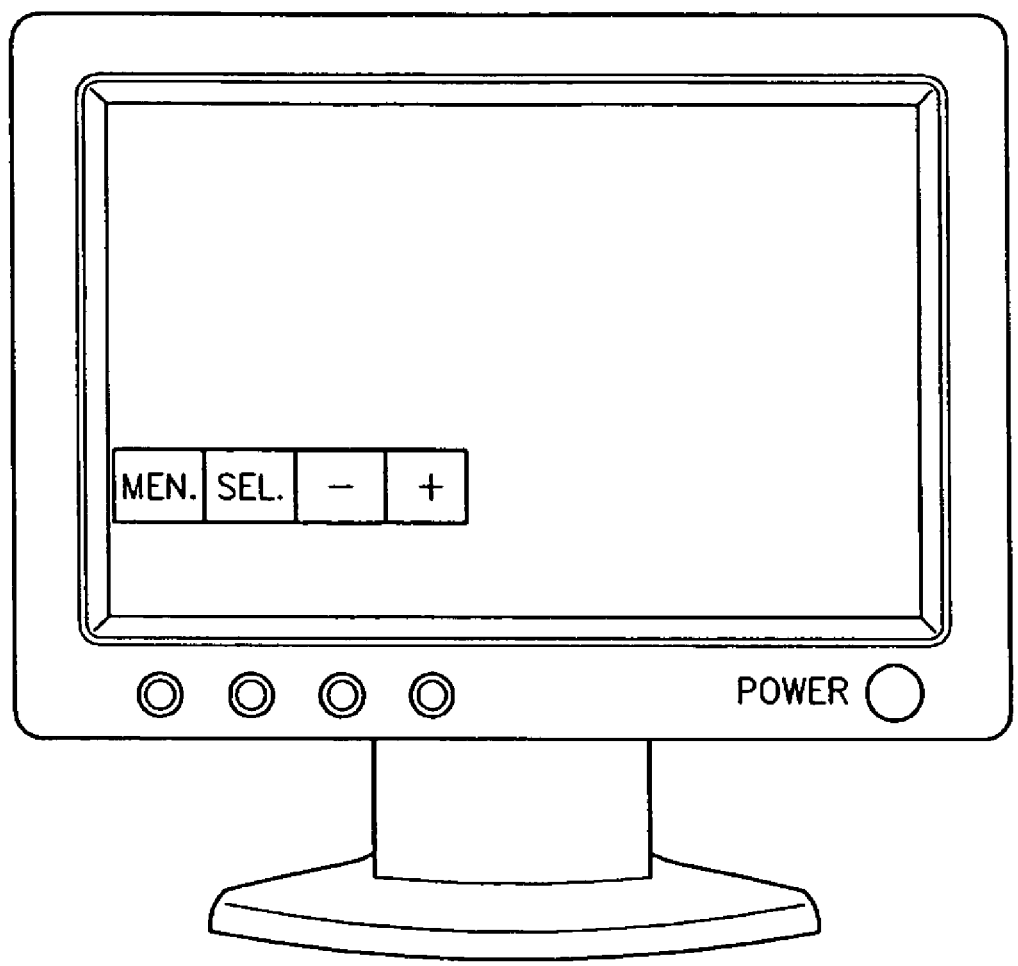
FIG. 3 is a drawing illustrating a case where the position of an image indicating functions of buttons of FIG. 2 is distant from the buttons.

Also, it is an aspect that the display zones are located at a position on the screen that is close to the buttons, so that the relationship between the buttons and the images is easily recognized. The display zones can be located somewhat distant from the buttons as shown in FIG. 3. However, the position of the display zones in FIG. 3 may make the relationship between the buttons and the images less recognizable than in the case of FIG. 2.

As described above, since the method of indicating functions of buttons according to an embodiment of the present invention involves displaying images that indicate the functions of the buttons at a location on a screen that is close to the buttons, text indicating the functions of the buttons does not have to be printed on the bezel. Therefore, the bezel can be made narrower by excluding space for printing.

Figure 4:
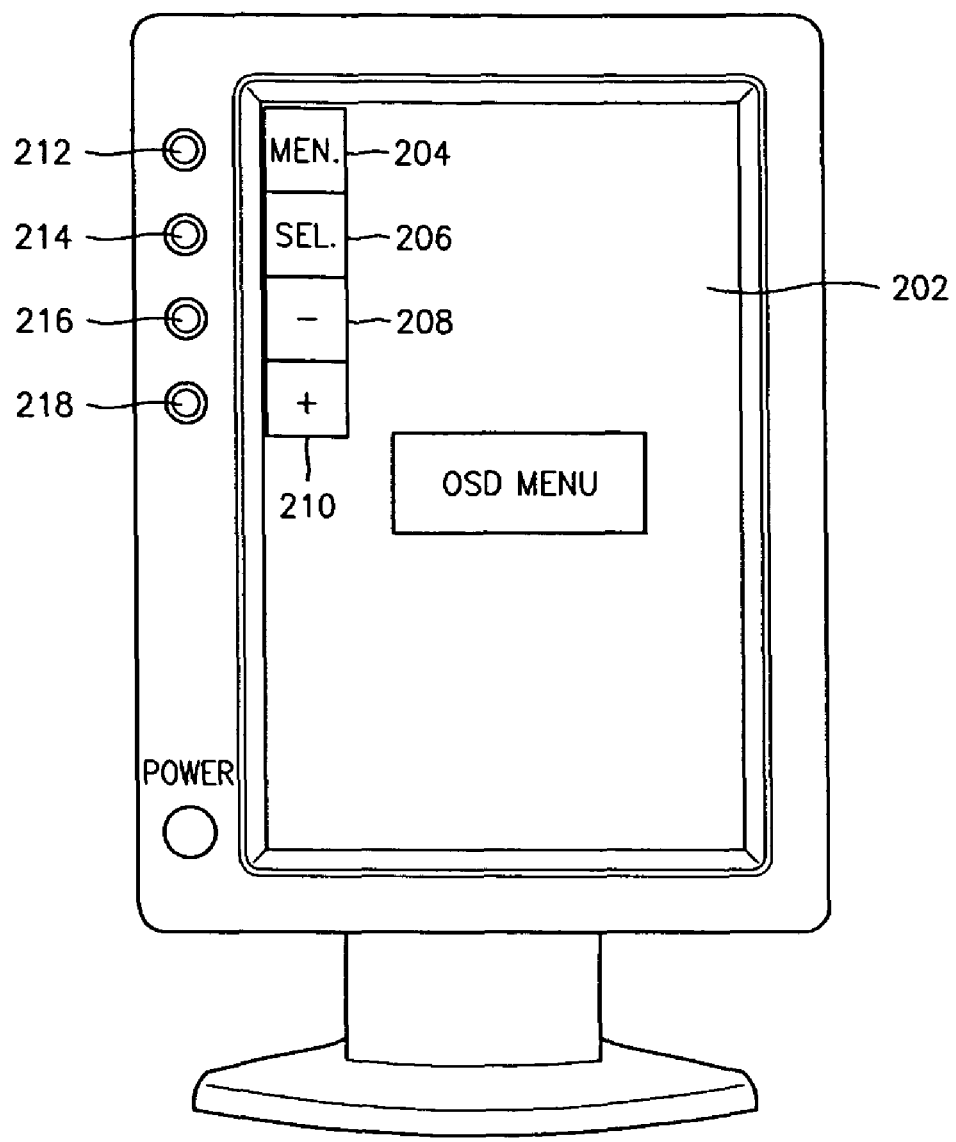
FIG. 4 shows a method of indicating functions of buttons according to another embodiment of the present invention.

FIG. 4 shows a method of indicating functions of buttons according to another embodiment of the present invention, in which the image display apparatus of FIG. 2 is pivoted vertically. In the first display zone 204 through the fourth display zone 210, "menu", "select", "+", and "−" are displayed, respectively. Here, although the display zones 204 through 210 are arranged vertically, "menu", "select", "+", and "−" are written horizontally. Thus, even when the image display apparatus is used in a pivot state, a user can easily recognize the functions of the buttons 212 through 218.

In the conventional art, since text indicating the functions of buttons is fixed on the frame around the screen of the image display apparatus, pivoting the screen makes it difficult to read the text. However, in the present invention, since images indicating buttons' functions are displayed horizontally even when the image display apparatus is pivoted vertically, readability of the displayed functions is not hindered.

Figure 5:
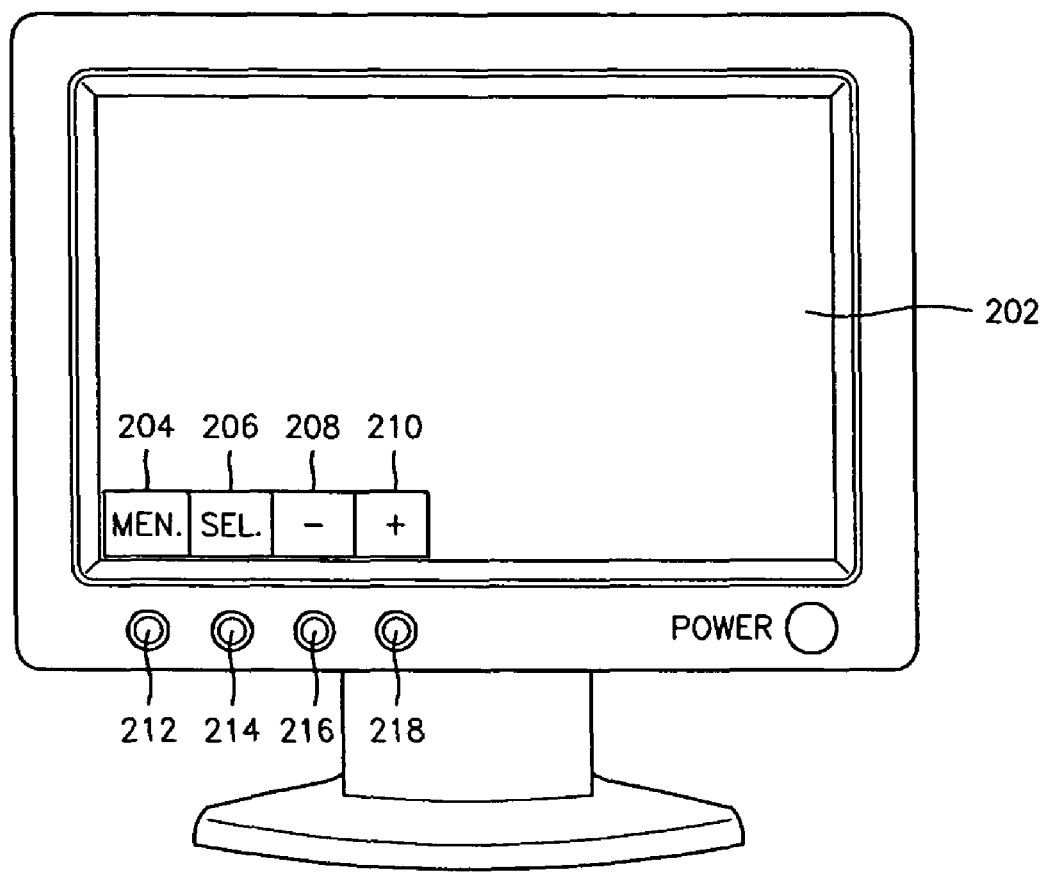
FIG. 5 shows a method of indicating functions of buttons according to yet another embodiment of the present invention.

FIG. 5 shows a method of indicating functions of buttons according to another embodiment of the present invention, in which functions of buttons are displayed in English. Referring to FIGS. 2 and 5, by the methods of indicating functions of buttons according to these embodiments of the present invention, the functions of buttons can be displayed in a user's preferred language.

FIGS. 6A through 6F show a method of indicating functions of buttons according to yet another embodiment of the present invention, in which the image display apparatus is a multi-function image input apparatus. The multi-function image input apparatus can accommodate various formats of image signals originating from various input sources, for example, analog R/G/B, digital TV, composite VBS, s-video, digital DVI, and CATV input sources.

FIG. 6A is an example of an image popping up when a menu key is pushed. In six image zones 602 through 612, "AUTO Adjustment", "BRIGHTNESS", "CONTRAST", "COLOR CONTROL", "LANGUAGE", and "SOURCE SELECT" are displayed. The image zones 602 through 612 are displayed on the screen close to their respective corresponding buttons.

If a button to change an input source, the button indicated by "SOURCE SELECT" displayed in the image zone 612, is pushed, a display state (e.g., color scheme) of the SOURCE SELECT zone 612 is inverted to indicate that it has been selected, as shown in FIG. 6B. Hereinafter, selecting a function means pushing the button corresponding to that function. After "SOURCE SELECT" is selected, an image to select an input source is displayed, as shown in FIG. 6C. Specifically, "RETURN MAIN", "ANALOG R/G/B", "D-TV", "S-VIDEO", and "NEXT" are displayed in the six image zones 602 through 612, respectively. At this point, the functions of the buttons have been redefined. In the method of indicating functions of buttons according to this embodiment of the present invention, since changed functions of the buttons can be displayed as images on the screen of the image display apparatus, the functions of buttons can be changed without difficulty, and menu design becomes very easy.

In the conventional art, to select one among analog R/G/B, digital TV, composite VBS, s-video, and CATV input sources, a search button must be repeatedly pushed until a focus reaches the desired input source. For example, to select the s-video item, the focus is sequentially moved through the analog R/G/B, the digital-TV, and the composite VBS items by continuously pushing a "+" or "−" button, and after the focus has been placed on the s-video item, the s-video input source is selected by pushing a select button. However, in the various embodiments of the present invention, since analog R/G/B, digital TV, composite VBS, and s-video input sources are assigned to buttons, as shown in FIG. 6C, the s-video input source, for example, can be selected by simply pushing the button corresponding to the s-video input source. This selection method removes the conventional limitations on menu design.

If "NEXT" is selected from the list of menu items shown in FIG. 6C, for example, because the desired input source is not among the menu items, the image shown in FIG. 6D consisting of "PREV", "DIGITAL DVI", "CATV", blank, blank, "RETURN" is displayed. In FIG. 6D, a significant feature is that the design as illustrated can prevent a user from pushing an unnecessary button by mistake, by displaying an image indicating an unnecessary button or displaying nothing for zones of unnecessary buttons when there are fewer selectable items in the menu than buttons. That is, as shown in FIG. 6D, accidental occurrence of an undesirable operation is prevented by displaying nothing for buttons without functions, and also by ignoring a push of a button without a function should the user accidentally push such a button.

Next, as shown in FIG. 6D, "DIGITAL DVI" can be selected to complete the process of selecting a desired input source. At this point, if the user wishes to return to the main menu, "RETURN" can be selected as shown in FIG. 6E. Then, the image shown in FIG. 6F corresponding to the main menu is displayed. Here, the image shown in FIG. 6F is different from the image shown in FIG. 6A. The image shown in FIG. 6A is the main menu when the multi-function image input apparatus is in an analog R/G/B input mode, and the image shown in FIG. 6F is the main menu when the multi-function image input apparatus is in a digital DVI input mode. Since an auto adjustment function and a contrast function are not necessary when an input source is "DIGITAL DVI", "AUTO Adjustment" and "CONTRAST" bars are not displayed in the menu shown in FIG. 6F.

Figure 7A:
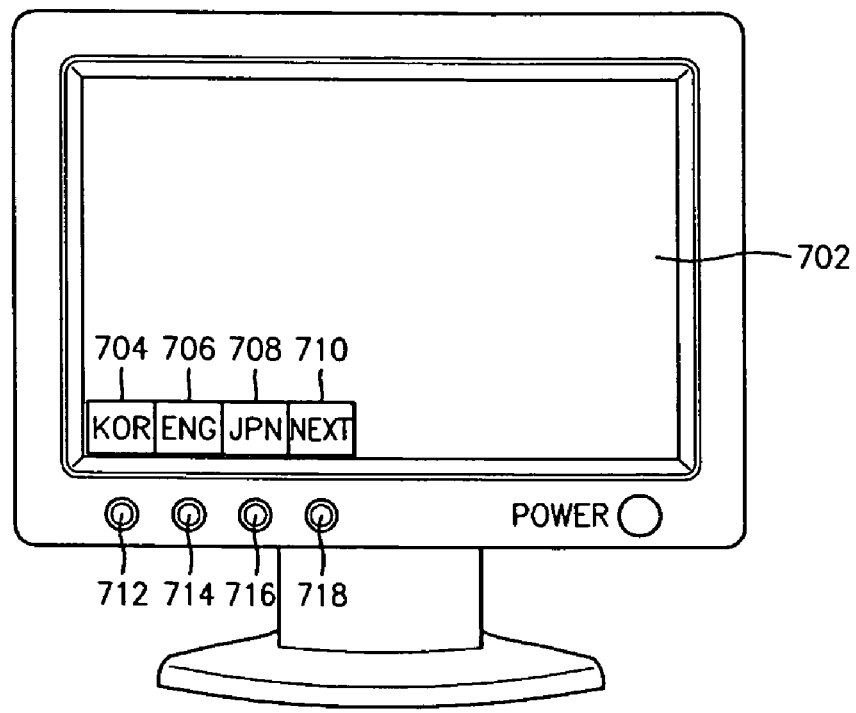
FIGS. 7A and 7B illustrate a method of indicating functions of buttons according to still further embodiments of the present invention.
Figure 7B:
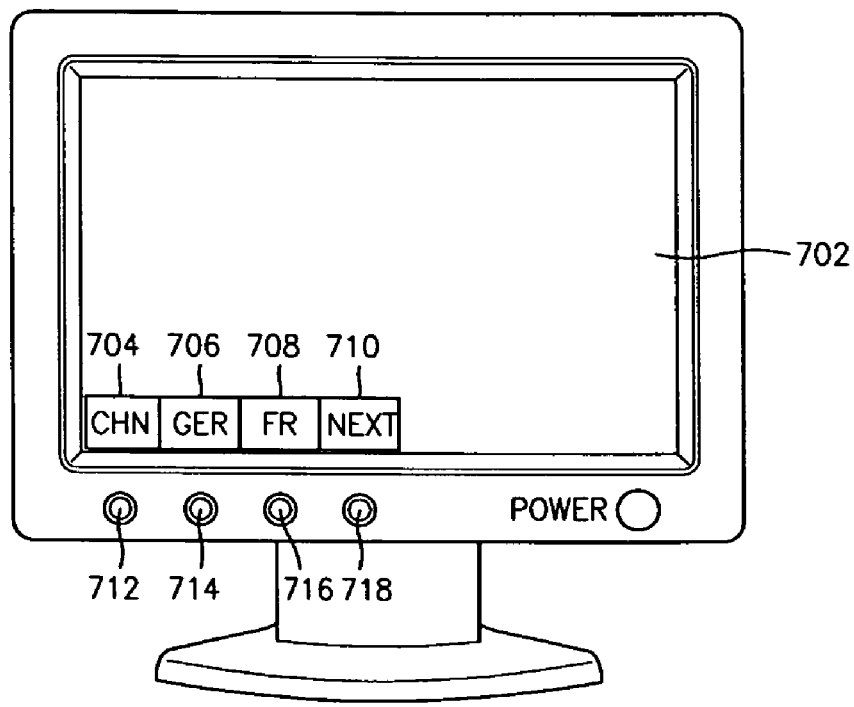

FIGS. 7A and 7B illustrates a method of indicating functions of buttons according to another embodiment of the present invention, in which there are a plurality of selectable items. Here, a preferred language should be selected from among a plurality supported languages. In this case, it is convenient for only a predetermined number of languages to be displayed in a first image, and remaining languages can be displayed by selecting a "NEXT LIST" item.

With reference to FIG. 7A, Korean, English, or Japanese can be selected by buttons 712 through 716, respectively, and a next list can be brought up by selecting a button 718 designated "NEXT LIST". If the button 718 designated "NEXT LIST" is pushed, Chinese, German, or French can be selected as shown in FIG. 7B. Thus, any number of menu items can be sequentially displayed and selected.

Figure 8:
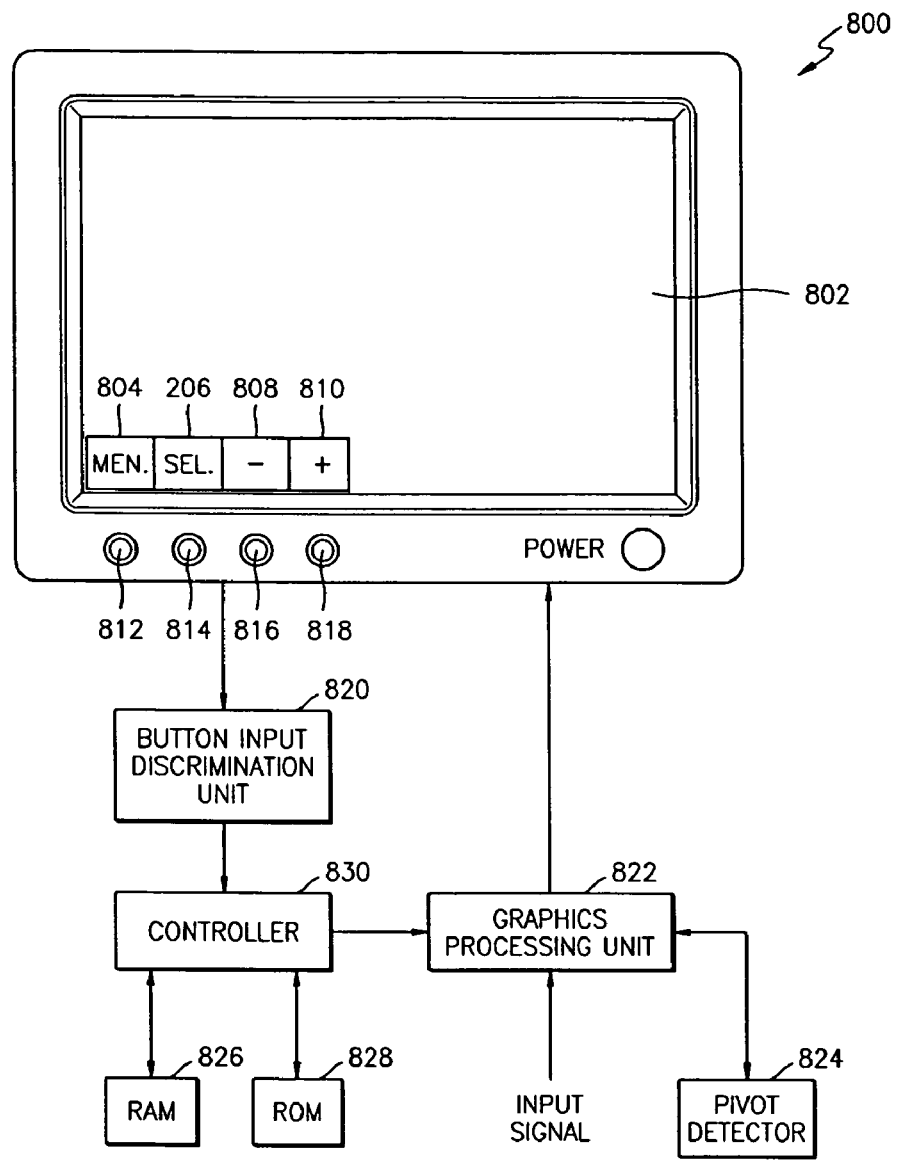
FIG. 8 is a block diagram of an image display apparatus according to another embodiment of the present invention.

FIG. 8 is a block diagram of an image display apparatus according to another embodiment of the present invention. The apparatus of FIG. 8 includes an image display unit 802 on which images are displayed, a plurality of buttons 812 through 818, and a plurality of zones 804 through 810 which are established on the image display unit 802 and display images indicating functions of the buttons 812 through 818. Here, the image display unit 802 can be a CRT or an LCD panel. The first button 812 is assigned to bring up a menu.

A button input discrimination unit 820 discriminates which button among the plurality of buttons 812 through 818 is pushed.

A controller 830 controls an image display apparatus 800 according to button input information supplied from the button input discrimination unit 820.

A graphics processing unit 822 processes an input image signal and supplies the processed image signal to the image display unit 802. The graphics processing unit 822 performs a demodulation process, a timing process, a scaling process, and an image composition process for an OSD menu display to generate an image corresponding to the input image signal. Also, the graphics processing unit 822 performs an image rotation process to display a rotated image corresponding to a pivot state of the image display unit 802.

A pivot detector 824 detects a pivot angle of the image display unit 802 and supplies the pivot angle to the graphics processing unit 822.

A RAM 826 and a ROM 828 store a program and data which enable the controller 830 to operate.

Here, if the first button 812 is pushed, the OSD menu is activated. The button input discrimination unit 820 detects that the first button is pushed. The button input discrimination unit 820 supplies button input information indicating that the first button has been pushed to the controller 830. When the controller 830 receives the button information indicating that the first button has been pushed, the controller 830 calls menu information of the OSD menu stored in the ROM and supplies the menu information to the graphics processing unit 822. The menu information includes zone information to display the OSD menu, selectable items, and order information for arranging the items. Also, the menu information further includes images (words in most cases) assigned to the buttons to select the selectable items and zone information to display the images. When the graphics processing unit 822 receives the menu information supplied by the controller 830, it displays the OSD menu according to the menu information. Also, the graphics processing unit 822 displays the images assigned to the buttons in corresponding zones, as shown in FIG. 2, for example.

In the apparatus 800 of FIG. 8, a frame can be more freely designed by displaying the functions of the buttons as images on the screen and excluding zones to print the functions of the buttons on the frame. Also, since various different functions can be given to each of the buttons if necessary, there is also more freedom to design menus. Moreover, in a case where there is a plurality of selectable items, items can be selected by an arbitrary method of assigning the items to respective buttons. Furthermore, when there are more selectable items in a menu than buttons, the items can be grouped into several groups, displayed as groups, and selected from within each group.

The pivot detector 824 detects the pivot angle of the image display unit 802 and supplies the pivot angle to the graphics processing unit 822.

The graphics processing unit 822 displays the OSD menu and the functions of the buttons with reference to pivot information supplied from the pivot detector 824. For example, if the image display unit 802 is pivoted by 90 degrees to the vertical direction, the graphics processing unit 822 processes pictures, the OSD menu, and the images indicating the functions of the buttons so that they are displayed horizontally on the vertically oriented image display unit 802. Thus, the user can easily view images and read text even when the image display unit 802 is in a pivoted state.

Figure 9:
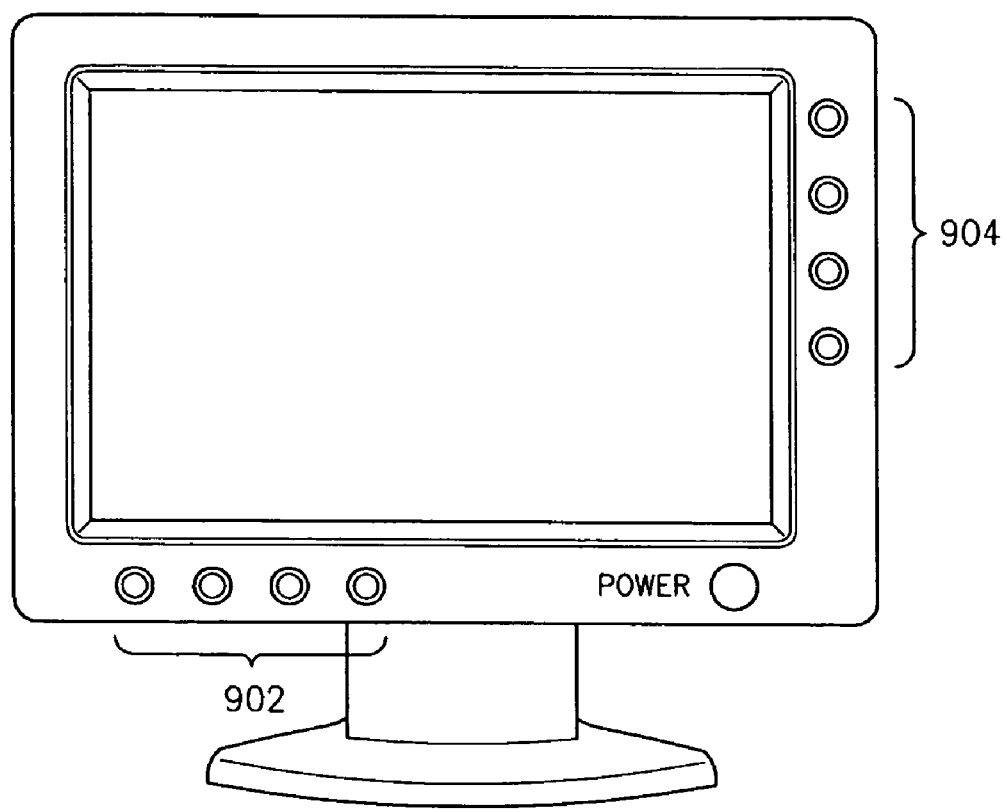
FIG. 9 shows an image display apparatus according to yet another embodiment of the present invention.

FIG. 9 is an image display apparatus according to another embodiment of the present invention, in which the image display apparatus has a second group of buttons. The apparatus of FIG. 9 includes button operation units 902 and 904 on the lower part and the right side of the image display apparatus, respectively. In a conventional image display apparatus, since text indicating functions of buttons must be printed horizontally, it is difficult for buttons to be placed on vertical (left or right) portions of the frame bezel. However, in the image display apparatus according to this embodiment, since no such printed text is required, it is easier for buttons to be placed on the vertical portions of the bezel as well as the horizontal portions.

Also, when the apparatus of FIG. 9 is pivoted by 90 degrees to a vertical state, the button operation unit 904 can be used like another button operation unit 902. That is, when the image display apparatus is not pivoted, as shown in FIG. 9, it can be operated using the first operation unit 902, and when it is pivoted, as shown in FIG. 4, it is operated using the second operation unit 904. This makes it easier for a user to operate the buttons.

FIG. 10 is a flowchart of an OSD menu processing method according to another embodiment of the present invention. According to the method of FIG. 10, the OSD menu is displayed on the screen of an image display unit rather than as text printed on the frame of an image display apparatus.

First, the OSD menu having selectable items is displayed in operation S1002 on the image display unit. The OSD menu includes a plurality of selectable items which are objects of search and selection.

An image indicating the functions of buttons to search and select the selectable items is generated in operation S1004. The most typical example of the image is text. That is, the text "SEARCH" for a search button and "SELECT" for a select button are generated.

Zones to display the image on the image display unit are set in operation S1006.

Here, it is an aspect that the zones to display the image are located close to the buttons on the image display unit in order to clearly show the correspondence between the buttons and the image indicating the functions of the buttons.

The image is displayed on the set zones in operation S1008.

Whether the selectable items are selected is recognized in operation S1010, according to whether and which buttons are pushed.

It is believed that those of ordinary skill in the art will fully understand that a method indicating functions of buttons according to various embodiments of the present invention is different from a method of indicating function keys in a computer application program. In a top-down menu or a pop-up menu of a computer application program, an example of items capable of being activated together with corresponding "shortcut" keys can be seen. However, the embodiments of the present invention are different for at least the reasons that zones to display functions indicating images close to buttons so that their spatial correspondence can be seen, and the functions of the buttons can change through manipulation thereof.

As described above, the methods of indicating functions of buttons according to various embodiments of the present invention provide more freedom in designing the frame of an image display apparatus by displaying the functions of buttons on an image display screen rather than printing them on the frame.

Also, the methods of indicating functions of buttons according to the present invention are convenient for users because images indicating the functions of the buttons are displayed horizontally to be easily recognized even when the image display apparatus is pivoted.

Also, the methods of indicating functions of buttons according to the embodiments of the present invention are convenient for users because selectable menu items are selected by an arbitrary direct-selection method that generally requires fewer button presses than a sequential method, even when there are numerous selectable items.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image display apparatus having buttons to select items of a display, comprising:
    an image display unit including zones to display an image indicating functions assigned to the buttons;
    a second set of buttons;
    a graphics processing unit to supply images displayed by the image display unit;
    a pivot detector to detect a pivot angle of the image display unit and to provide the pivot angle detected to the graphics processing unit such that the graphics processing unit supplies an image to the image display unit at a same pivot angle as the image display unit; and a controller to set display parameters of the image display apparatus, to perform operations assigned to the buttons, to generate image information to be displayed in the zones and to supply the image information to the graphics processing unit, wherein the image display unit displays the image in the zones rotated according to the pivot angle at a position close to the buttons, and wherein when the image display unit is pivoted, the zones become in close corresponding relationship with the second set of buttons.

2. The image display apparatus of claim 1, wherein the zones are in a close corresponding relationship with the respective button.

3. The image display apparatus of claim 1, wherein the functions can be displayed in several different languages.

4. The image display apparatus of claim 1, further comprising:
a button discrimination unit to discriminate which button is pushed.

5. The image display apparatus of claim 1, wherein the image is displayed when any one of the buttons is pushed.

6. The method of claim 1, wherein at least one of the image and an OSD menu having selectable items to adjust the display parameters of the image display apparatus is displayed, when any one of the buttons is pushed.

7. The method of claim 1, wherein the buttons are disposed on a front frame of the display apparatus.

8. A method of displaying images with an image display apparatus, the method comprising:
receiving an image to be displayed by an image display unit of the image display apparatus;
setting display parameters of the image display apparatus with a controller, the controller having buttons for item selection and performing operations assigned to the buttons;
generating an image indicating functions assigned to the buttons; and
displaying the image on the image display apparatus at a position close to the buttons, and wherein the displaying of the image on the image display apparatus further comprises:
detecting a pivot angle of the image display apparatus, and
displaying the image rotated according to the pivot angle at a position close to the buttons,
displaying the generated image indicating functions assigned to the buttons at a position close to the buttons in zones of the image display apparatus according to the detected pivot angle.

9. The method of claim 8, wherein the image is text indicating the functions assigned to the buttons.

10. The method of claim 9, wherein the language of the text can be selected by a user.

11. The method of claim 9, wherein the image also includes symbols indicating at least one function assigned to at least one respective button.

12. The method of claim 8, wherein at least one of the image and an OSD menu having selectable items to adjust display parameters of the image display apparatus is displayed, when any one of the buttons is pushed.

13. The method of claim 8, wherein the buttons are disposed on a front frame of the display apparatus.

14. An image display apparatus comprising:
an image display unit;
a graphics processing unit which supplies images displayed by the image display unit;
a controller which sets display parameters of the image display apparatus, has buttons for item selection, and performs operations assigned to the buttons; and
a pivot detector which detects a pivot angle of the image display apparatus and supplies pivot angle data to the graphics processing unit,
wherein:
the image display unit has zones to display an image indicating functions assigned to the buttons, and the controller generates image information to be displayed in the zones and supplies the image information to the graphics processing unit,
the zones to display an image indicating functions assigned the buttons are displayed at a position on the image display apparatus close to the buttons, and
the graphics processing unit displays the image in the zones rotated according to the pivot angle at a position close to the buttons.

15. The apparatus of claim 14, wherein the image indicating functions assigned the buttons is text indicating the functions assigned to the buttons.

16. The method of claim 14, wherein at least one of the image and an OSD menu having selectable items to adjust the display parameters of the image display apparatus is displayed, when any one of the buttons is pushed.

17. The method of claim 14, wherein the buttons are disposed on a front frame of the display apparatus.

18. A method of controlling a display device having at least one of input unit positioned on a housing of the display device, the method comprising:
displaying at least one symbol on a screen, the at least one symbol indicative of a function to control the display device, the at least one symbol being assigned to the at least one input unit;
changing an orientation of the at least one symbol in accordance with a detection of a viewing state of the screen, in which the viewing state relates to a rotated state of the screen; and
controlling the function of the display device upon actuation of the at least one input unit,
wherein the at least one symbol visually corresponds to at least one input unit, the at least one input unit is disposed near the at least one symbol, and the at least one input unit is disposed so as to be flush with the surface of the screen,
wherein changing an orientation of the at least one symbol further comprises:
displaying the at least one symbol, whose orientation is changed, at a position close to the at least one input unit, and
wherein at least one of the at least one symbol and an OSD menu having selectable items to adjust display parameters of the screen is displayed when the at least one input unit is actuated.

19. A method of controlling a display device having at least one of input unit positioned on a housing of the display device, the method comprising:
displaying at least one symbol on a screen, the at least one symbol indicative of a function to control the display device, the at least one symbol being assigned to the at least one input unit;

changing an orientation of the at least one symbol in accordance with a detection of a viewing state of the screen, in which the viewing state relates to a rotated state of the screen; and controlling the function of the display device upon actuation of the at least one input unit, wherein the at least one symbol visually corresponds to at least one input unit, the at least one input unit is disposed near the at least one symbol, and the at least one input unit is disposed so as to be flush with the surface of the screen, wherein changing an orientation of the at least one symbol further comprises:

displaying the at least one symbol, whose orientation is changed, at a position close to the at least one input unit, and wherein the at least one input unit is disposed on a front frame of the display apparatus.

* * * * *